US012555060B2

(12) United States Patent
Baviskar et al.

(10) Patent No.: US 12,555,060 B2
(45) Date of Patent: Feb. 17, 2026

(54) MACHINE LEARNING BASED EXPENSE REPORT ANOMALY DETECTION

(71) Applicant: Oracle International Corporation, Redwood Shores, CA (US)

(72) Inventors: Akash Baviskar, Maharashtra (IN); Krishnan Ramanathan, Varthur Hobli (IN)

(73) Assignee: Oracle International Corporation, Redwood Shores, CA (US)

( * ) Notice: Subject to any disclaimer, the term of this patent is extended or adjusted under 35 U.S.C. 154(b) by 162 days.

(21) Appl. No.: 17/994,136

(22) Filed: Nov. 25, 2022

(65) Prior Publication Data
US 2024/0086819 A1 Mar. 14, 2024

Related U.S. Application Data

(60) Provisional application No. 63/406,509, filed on Sep. 14, 2022.

(51) Int. Cl.
*G06Q 10/0639* (2023.01)

(52) U.S. Cl.
CPC . *G06Q 10/06398* (2013.01); *G06Q 10/06393* (2013.01)

(58) Field of Classification Search
CPC ............... G06Q 10/06398; G06Q 10/06393
See application file for complete search history.

(56) References Cited

U.S. PATENT DOCUMENTS

| 11,321,784 | B2 | 5/2022 | Verma et al. |
| 11,954,739 | B2* | 4/2024 | Verma ............... G06F 16/24542 |
| 2002/0038265 | A1* | 3/2002 | Mertz .................. G06Q 10/087 |
| | | | 705/28 |
| 2006/0224400 | A1* | 10/2006 | Chkodrov ............. G06Q 10/00 |
| | | | 705/1.1 |

(Continued)

FOREIGN PATENT DOCUMENTS

CA 2542524 A1 * 10/2007 ......... G06Q 10/0637

OTHER PUBLICATIONS

Wasserbacher et al. "Machine learning for financial forecasting, planning and analysis: recent developments and pitfalls" (2021) (https://link.springer.com/article/10.1007/s42521-021-00046-2) (Year: 2021).*

(Continued)

*Primary Examiner* — Sujay Koneru
(74) *Attorney, Agent, or Firm* — Potomac Law Group, PLLC (57) ABSTRACT

Embodiments perform the anomaly detection of expense reports in response to receiving an expense report as input data, the expense report including a plurality of expenses. Embodiments create a plurality of groups of expenses, each group corresponding to a different combination of a category of the expense, a location of the expense and a season of the expense. Embodiments generate and train an unsupervised machine learning model corresponding to each group, and assign each of the expenses of the expense report into a corresponding group and input the expenses into the unsupervised machine learning model corresponding to the group. Embodiments then generate an anomaly prediction at each unsupervised machine learning model for each expense of the expense report.

20 Claims, 6 Drawing Sheets

(56) References Cited

U.S. PATENT DOCUMENTS

| | | | | |
|---|---|---|---|---|
| 2008/0313063 | A1* | 12/2008 | Testa | G06Q 10/107 |
| | | | | 705/30 |
| 2009/0076880 | A1* | 3/2009 | Kramer | G06Q 10/06 |
| | | | | 707/999.102 |
| 2010/0268673 | A1* | 10/2010 | Quadracci | G06Q 10/10 |
| | | | | 707/E17.014 |
| 2012/0066136 | A1* | 3/2012 | Calahan | G06Q 50/18 |
| | | | | 705/311 |
| 2012/0278713 | A1* | 11/2012 | Roopan | G09B 19/00 |
| | | | | 715/706 |
| 2014/0244488 | A1* | 8/2014 | Kim | G06Q 20/306 |
| | | | | 705/39 |
| 2016/0358268 | A1* | 12/2016 | Verma | G06Q 40/12 |
| 2018/0053401 | A1* | 2/2018 | Martin | H04M 11/04 |
| 2018/0144311 | A1* | 5/2018 | Unnerstall | G06Q 20/108 |
| 2018/0248905 | A1* | 8/2018 | Côté | G06N 3/08 |
| 2018/0268448 | A1* | 9/2018 | Simantov | G06Q 30/04 |
| 2020/0126037 | A1* | 4/2020 | Tatituri | G06N 20/00 |
| 2020/0134535 | A1* | 4/2020 | Nathani | G06Q 10/06398 |
| 2021/0004580 | A1* | 1/2021 | Sundararaman | G06V 30/224 |
| 2022/0012817 | A1* | 1/2022 | Singh | G06N 3/08 |
| 2022/0147897 | A1* | 5/2022 | Liebman | G06Q 10/06314 |

OTHER PUBLICATIONS

Forsten, "Unsupervised Anomaly Detection in Receipt Data", Degree Project in Computer Science and Engineering, Second Cycle, Stockholm, Sweden, Kth Royal Institute of Technology School of Computer Science and Communication, Sep. 17, 2017, pp. 1-46, Retrieved from the internet.

Richter, "Machine learning behind the scenes of SAP RealSpend—An expense anomaly detection algorithm explained", May 28, 2018, Retrieved from the internet <https://blogs.sap.com/2018/05/28/machine-learning-behind-the-scenes-of-sap-realspend-an-expense-anomaly-detection-algorithm-explained/>.

* cited by examiner

Anomalous Claim – An example

| EXPENSE_ID | EXPENSE_DIST_AMOUNT | EXPENSE_AMOUNT | TRANSACTION_DATE | END_DATE | EXPENSE_TYPE | LOCATION | ATTENDEES | EMPLOYEE_ID |
|---|---|---|---|---|---|---|---|---|
| 1 | 45 | | 01/01/2022 | 01/01/2022 | Meals | London | 1 | e1 |
| 2 | 50 | | 01/01/2022 | 01/01/2022 | Meals | London | 1 | e2 |
| 3 | 50 | | 01/01/2022 | 01/01/2022 | Meals | London | 1 | e3 |
| 4 | 60 | | 01/01/2022 | 01/01/2022 | Meals | London | 1 | e4 |
| 5 | 500 | | 01/01/2022 | 01/01/2022 | Meals | London | 1 | e5 |
| 6 | 55 | | 01/01/2022 | 01/01/2022 | Meals | London | 1 | e6 |

Possibly Anomaly — 302

MACHINE LEARNING BASED EXPENSE REPORT ANOMALY DETECTION

CROSS REFERENCE TO RELATED APPLICATIONS

This application claims priority of U.S. Provisional Patent Application Ser. No. 63/406,509, filed on Sep. 14, 2022, the disclosure of which is hereby incorporated by reference.

FIELD

One embodiment is directed generally to a computer system, and in particular to expense report anomaly detection using a computer system.

BACKGROUND INFORMATION

Company/organization employees submit expenses occurred for valid business needs, such as business travel (e.g., airfare or car rental), accommodations, meals, phone or internet bills, entertainment, miscellaneous, etc. These submitted expenses are sometimes checked manually by managers/supervisors and approved for reimbursements, and occasionally some of the expenses are audited for fraud (generally approximately 2-3% in typical organizations).

Sometimes, intentionally or unintentionally, employees submit expense claims which are unreasonable, or do not follow a pattern in past claims by peers, or have an unexpected higher magnitude as compared to the past claims. For example, an employee may submit a claim of $500 in a city for one day of meals, while other peers have claimed an average amount of $50 for the same expense in the same city in the past. In this example, the claim should be flagged as anomalous and verified closely before getting reimbursement approval.

SUMMARY

Embodiments perform the anomaly detection of expense reports in response to receiving an expense report as input data, the expense report including a plurality of expenses. Embodiments create a plurality of groups of expenses, each group corresponding to a different combination of a category of the expense, a location of the expense and a season of the expense. Embodiments generate and train an unsupervised machine learning model corresponding to each group, and assign each of the expenses of the expense report into a corresponding group and input the expenses into the unsupervised machine learning model corresponding to the group. Embodiments then generate an anomaly prediction at each unsupervised machine learning model for each expense of the expense report.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

One embodiment is a machine learning based system that automatically detects employee expense anomalies using unsupervised machine learning models that do not require labeled data to be trained. Embodiments further provide anomaly predictions and reports at multiple aggregation levels.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
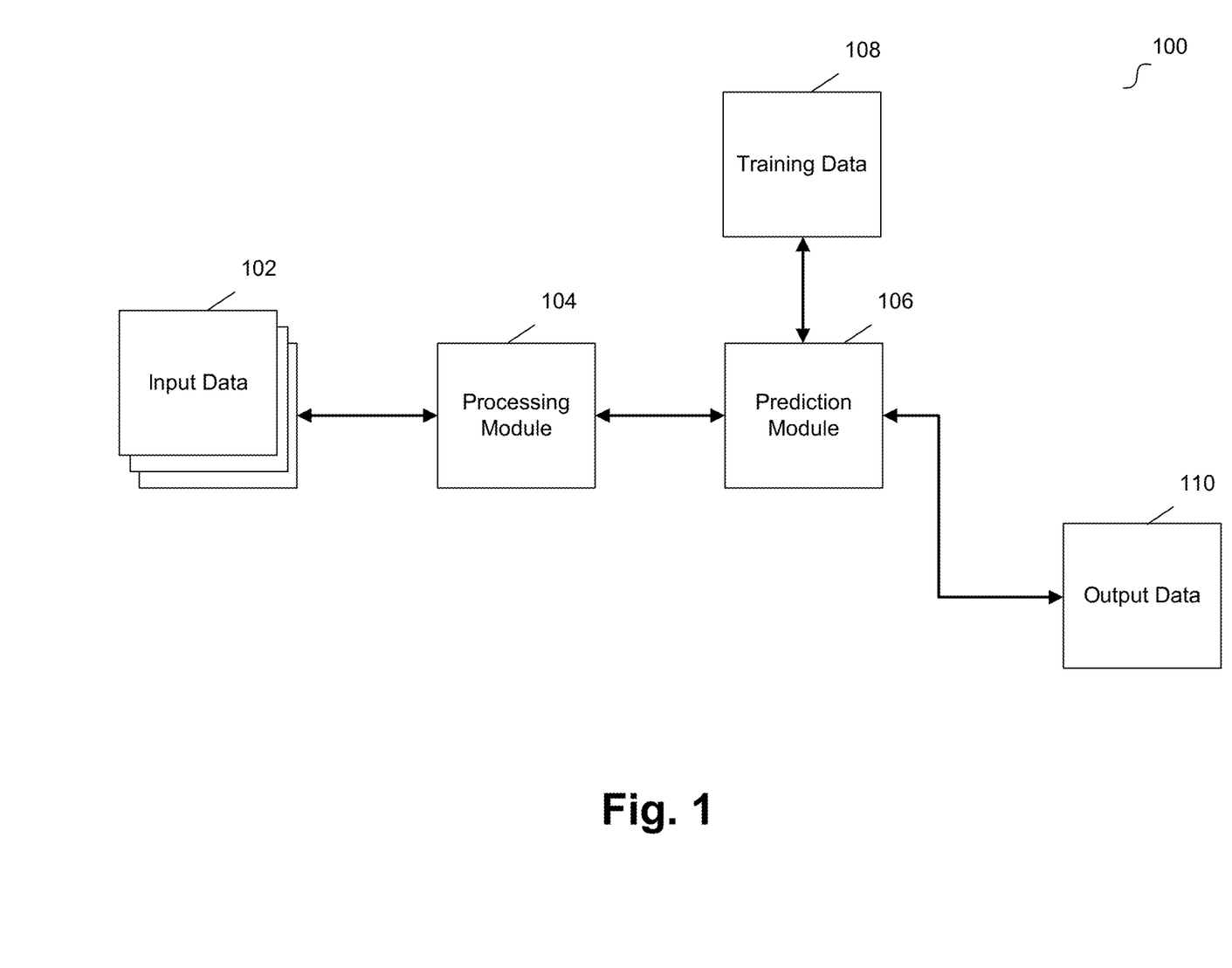
FIG. 1 illustrates a system for detecting anomalies in employee expense reports using machine learning or artificial intelligence according to an example embodiment.

FIG. 1 illustrates a system for detecting anomalies in employee expense reports using machine learning ("ML") or artificial intelligence ("AI") according to an example embodiment. System 100 includes input data 102, a processing model 104, a prediction module 106, training data 108, and output data 110. In some embodiments, input data 102 can include several elements or rows of data, and the data can be processed by processing module 104. For example, processing module 104 can generate metadata profiles based on input data 102. In some embodiments, the metadata profiles, not the input data itself, is fed to prediction module 106.

In some embodiments, prediction module 106 can be a machine learning model (e.g., neural network, support vector machine ("SVM"), random forest, gradient boosting, etc.) that is trained by training data 108. For example, training data 108 can include labeled data, such as metadata profiles generated by processing labeled and/or structured data. However, as disclosed below, in embodiments, a tree based model is used, which obviates the need for labeled training data. Prediction model 106 can generate output data 110, such as listing and rankings of predicted expense report anomalies, in response to input data 102.

Figure 2:
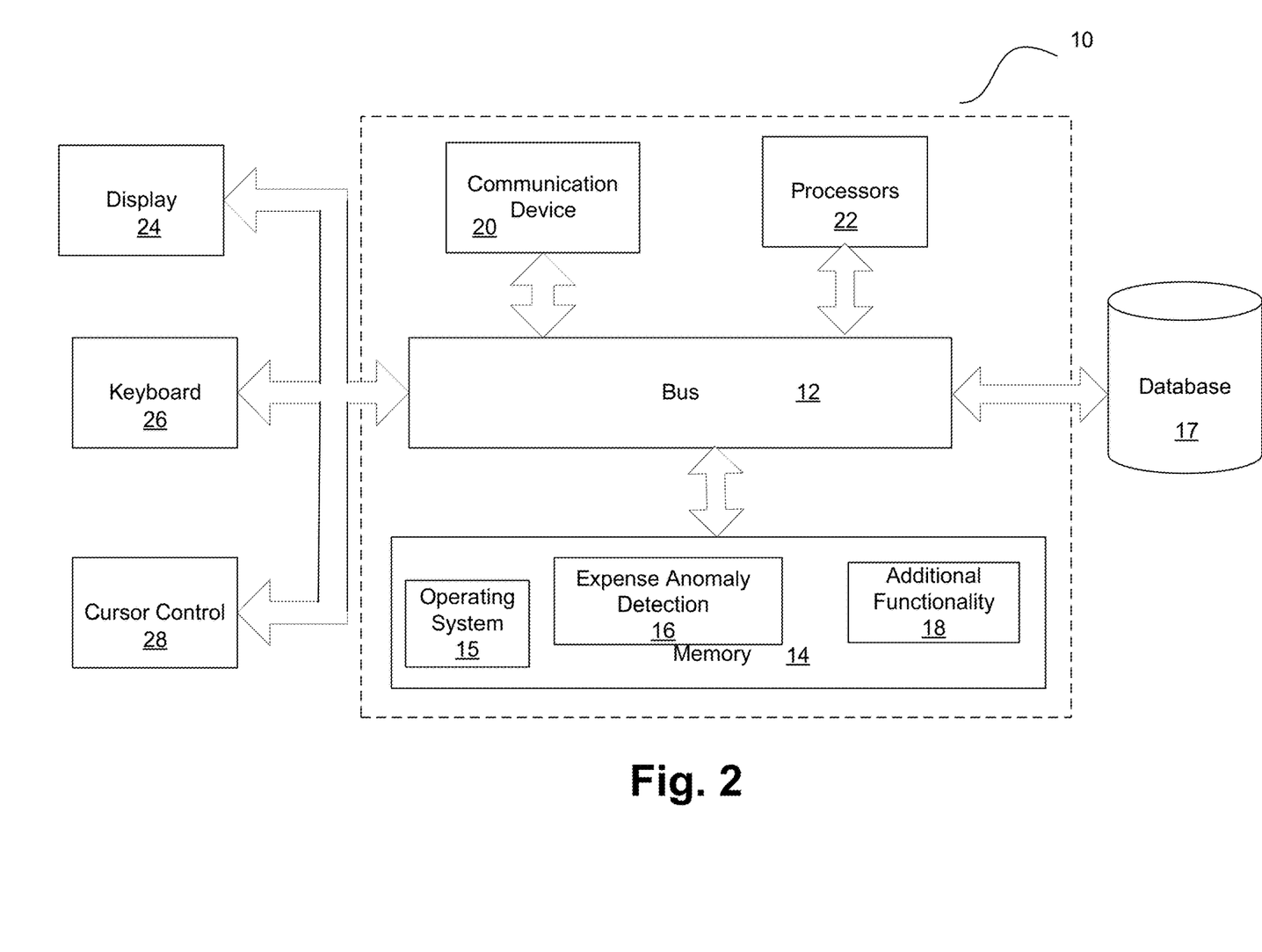
FIG. 2 is a block diagram of a computer server/system in accordance with an embodiment of the present invention.

FIG. 2 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. System 10 can centrally provide the functionality for all or some of the components shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an expense anomaly detection module 16 that provides ML based expense anomaly detection, and all other functionality disclosed herein. System 10 can be part of a larger system. Therefore, system 10 can include one or more additional functional modules 18 to include the additional functionality, such as "Fusion Financials" from Oracle Corp. or an enterprise resource planning ("ERP") system that includes an expense report auditing function. A database 17 is coupled to bus 12 to provide centralized storage for modules 16 and 18 and store customer data, product data, transactional data, etc. In one embodiment, database 17 is a relational database management system ("RDBMS") that can use Structured Query Language ("SQL") to manage the stored data.

In one embodiment, system 10 is a computing/data processing system including an application or collection of distributed applications for enterprise organizations, and may also implement logistics, manufacturing, and inventory management functionality. The applications and computing system 10 may be configured to operate locally or be implemented as a cloud-based networking system, for example in an infrastructure-as-a-service ("IAAS"), platform-as-a-service ("PAAS"), or software-as-a-service ("SAAS") architecture.

Figure 3:
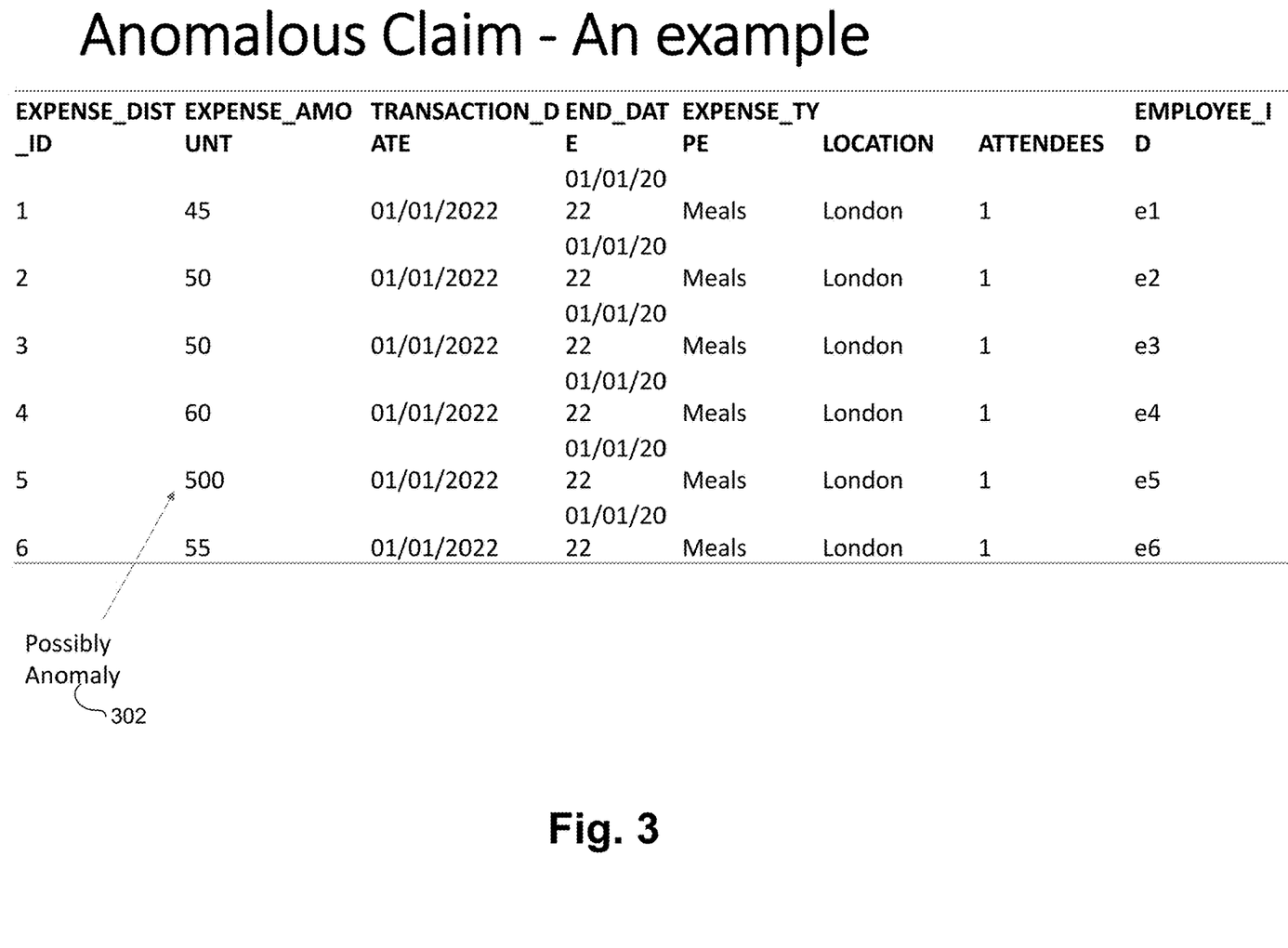
FIG. 3 is an example of a set of expense claims from different employees for a meal on the same date, and same location.

As disclosed, in order to avoid mistakes and/or fraud, expense reports need to be reviewed/audited for accuracy. FIG. 3 is an example of a set of expense claims from different employees for a meal on the same date, and same location. As shown at 302, because one employee submitted an amount of $500, while the other employees submitted amounts in the range of $45-60, the $500 expense should be flagged after a review.

One known solution to detect anomalies is to manually review expense reports. Expenses are sometimes checked manually by managers and approved for reimbursements, and occasionally some of the expenses are audited for fraud (typically around 2-3%). However, doing this manually is time and energy consuming and not feasible for large datasets and has limitations on accuracy.

Another known solution uses autoencoders try to encode the input vector into lower dimensional space, and then try to reconstruct the original input. If the reconstructed vector is close to the original input, then the input sample has high chances of being non-anomalous. Otherwise, the input sample has high chances of being anomalous. However, this method needs considerable past data for training the autoencoders to get good accuracy and needs heavy computations.

In another known solution, signal processing is used, where previous k expenses claimed by a user are taken as input and it is predicted if the current expense claimed is anomalous or not. However, this solution does not take into account the expense type and location of expense occurred, and seasonal trends.

In another known solution, labels are generated for training data using clustering approaches, user feedback is received for the labels, and then a supervised algorithm is trained. However, this approach is sensitive to clustering output and requires user intervention to further label the data.

Figure 4:
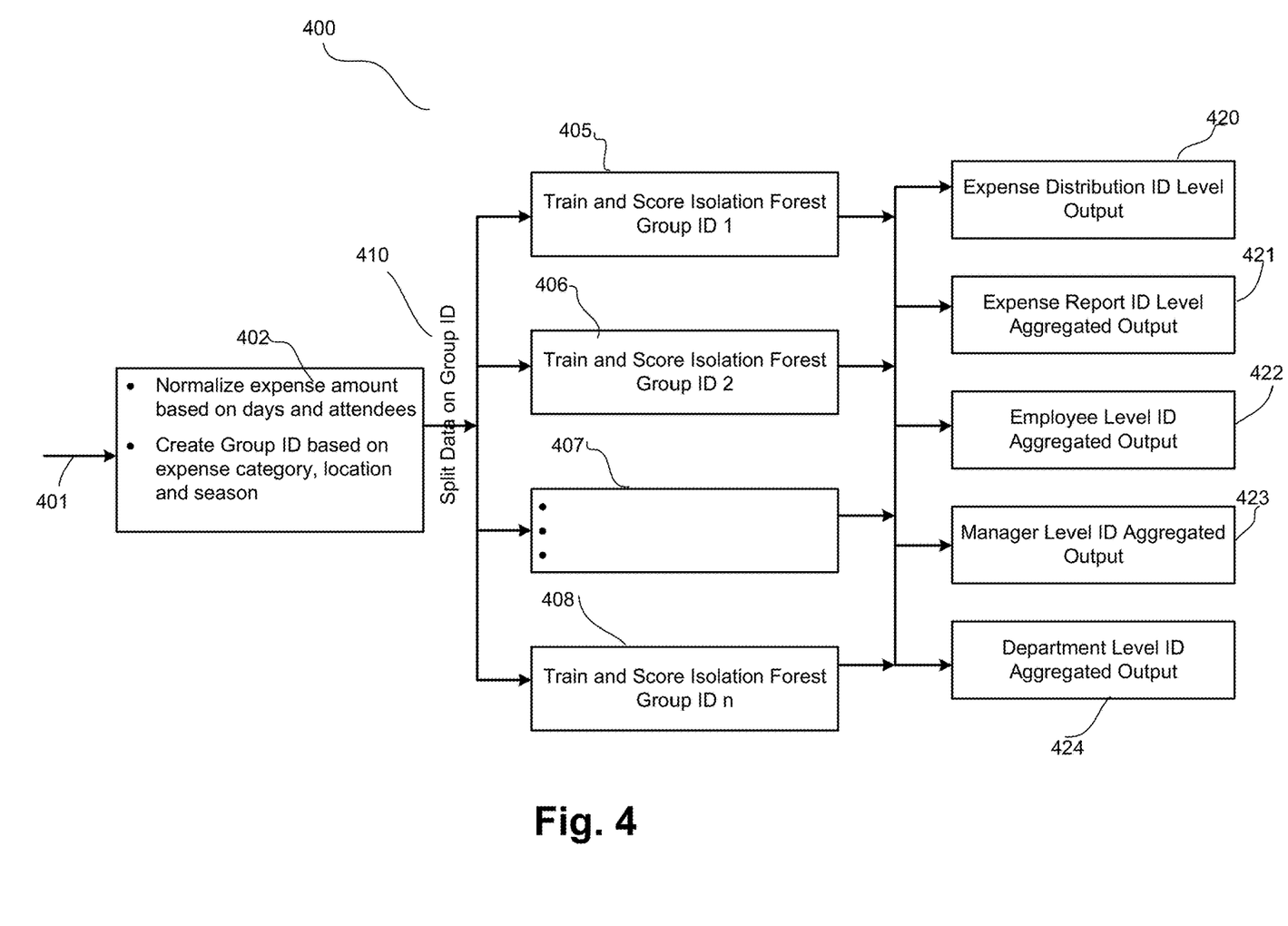
FIG. 4 is a flow/system diagram of the functionality of the expense anomaly detection module of FIG. 2 for performing expense report anomaly detection in accordance with one embodiment.

FIG. 4 is a flow/system diagram of the functionality 400 of expense anomaly detection module 16 of FIG. 2 for performing expense report anomaly detection in accordance with one embodiment. In one embodiment, the functionality of the flow diagram of FIG. 4 (and FIG. 5 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Embodiments utilize expense reports having one or more of the fields/columns shown in Table 1 below. In other embodiments, a different combination of fields can be used. In embodiments, the fields can be stored in a database as a specialized data structure as a database table.

TABLE 1

| Field Name | Description |
| --- | --- |
| EXPENSE_REPORT_ID | Unique Id of each expense report |
| EXPENSE_DIST_ID | Unique Id of sub-expenses in the expense report. (An EXPENSE_REPORT_ID can correspond to multiple EXPENSE_DIST_IDs e.g., an expense contains 2 sub-expenses, first for airfare and second for accommodation) |

TABLE 1-continued

| Field Name | Description |
| --- | --- |
| GLOBAL_EXPENSE_AMOUNT | Expense Amount of EXPENSE_DIST_ID |
| TRANSACTION_DATE | Start date |
| END_DATE | End date |
| EXPENSE_TYPE_CATEGORY_CODE | Expense category code ['AIRFARE', 'MISC', 'ACCOMMODATIONS', 'MEALS', 'CAR_RENTAL', 'ENTERTAINMENT' etc.] |
| TRAVEL_TYPE | Domestic/International travel in case AIRFARE |
| LOCATION | Location city where expense occurred |
| ATTENDEES | Total number of attendees |
| EMPLOYEE_ID | Unique Id of employee claiming the expense |
| MANAGER_ID | Unique Id of manager of employee |
| DEPARTMENT_ID | Department Id of employee |

In generally, the functionality of FIG. 1 in one embodiment uses an isolation forest model, which is an unsupervised machine learning model for anomaly detection, or any other unsupervised model. Isolation forest detects anomalies using isolation (i.e., how far a data point is from the rest of the data), rather than modeling the normal points. Embodiments make predictions at the expense distribution ID level (i.e., the unique ID for each sub-expense in an expense report, such as airfare, hotels and meals), and then rolls up/aggregates the predictions at the expense report ID level, employee ID level, manager ID level and department ID level.

System 400 receives input data 401 in the form of one or more expenses reports to be audited having fields of Table 1 above. Initially, before training, input data 401 is a complete training data or complete historic data available until the day of training (e.g., multiple expense reports from the past). Using the historical data, embodiments can train the models on the complete data available and also make predictions on the complete data. Embodiments can also train on data older than, for example, 6 months but not older than 3 years, and then make prediction on data from the previous 6 months only, or previous 1 month, etc. The input data that is used for making the predictions, either in conjunction with training or subsequent to training using older data, is considered "live" input data 401.

At 402, input data 401 is preprocessed. In addition to handling null and junk values in the data, embodiments normalize the GLOBAL_EXPENSE_AMOUNT by dividing it with number of days between the TRANSACTION_DATE and the END_DATE. In general, if an employee wants to claim accommodation/hotel expenses for n days, then embodiments divide the GLOBAL_EXPENSE_AMOUNT by n to get the expense claimed for one day of accommodation, because there will be other expenses which may be claimed for a different number of days and comparing these expenses without normalizing will be inaccurate.

Similarly, because in some instances the total number of attendees for an expense such as a meal could be more than one, embodiments divide the GLOBAL_EXPENSE_AMOUNT by the number of attendees.

Preprocessing at 402 further includes creating a Group ID for each category (e.g., Group ID 1 for airfare incurred during December, Group ID 2 for hotels in New York City during June, etc.) including segregating at the expense category, location, and season. The range of an expense can vary by a wide margin depending on the location where the expense occurs, the expense category and the season (e.g., Summer, Winter, etc.) of expense. For example, the expense amount required for an accommodation (e.g., hotel room) of one day at Davenport, Iowa will vary from the accommodation of one day at New York, New York. Similarly, the expense amount for an airline ticket for one employee is likely different than a one day hotel expense or a monthly cell phone bill or a car rental.

Further, the cost of a flight ticket or hotel can be higher during a holiday season as compared to normal time. Therefore, embodiments segregate the data based on the category, location and season. In general, the total number of segregated groups will be equal to the "total number of distinct categories in the data" multiplied by the "total number of locations in the data" multiplied by "total number of seasons" (number of seasons could be defined by different months or other logical grouping of months is also possible). For example, assume employees of a company visit 5 different cities in the United States, and there are 5 different types of expense categories which could be claimed, and 3 different possible seasons. In this case, the total number of groups=5×5×3=75. The following pseudocode implements embodiments:

```
if (expense type = AIRFARE)
    group_id = expense_type + '_' + source + '_' + destination + '_' + season
else:
    group_id = expense_type + '_' + location + '_' + season
```

At 410, the data is split based on each corresponding Group ID and then sent to corresponding isolation forest models 405-408, so there is a corresponding model for each Group ID. In some embodiments, such as the above example, there are 75 different Group IDs, and therefore 75 corresponding isolation forest models used.

After segregating the data at 410, embodiments train each separate isolation forest model 405-408 for each segregated group. For example, there will be different models, corresponding to different Group IDs for making predictions on the following expenses.

Meal expenses incurred at Davenport, Iowa during the month of May;

Meal expense incurred at NYC during the month of May;

Meal expenses incurred at Davenport, Iowa during the month of June; and

Car rental expenses incurred at Davenport, Iowa during the month of May.

Embodiments generate a parameter referred to as "training data timeframe" to select training data based on which data can be selected belonging to previous "training data timeframe" months to train the models. The training data timeframe parameter is used to select a subset of historical data from previous expense reports which are not older than, for example, 3 years, to minimize inflation effects. For example, by setting the appropriate value of "training data timeframe" parameter, this will pick data belonging to the recent past only, and inflation effects can be minimized. For example, if a company wanted to use system 400 today, historical data from previous expense reports is used as training data for the models. These models are then used for predictions on live incoming data in the future. Using the same models, embodiments can also make predictions on historical data as well if a company wants to explore the historical trends such as how many past expense reports are anomalous, etc.

Isolation forest models are a collection of unsupervised decision trees, which are different from normal supervised decision trees and works on numerical feature data. While building an individual tree in an isolation forest, every split is done on a randomly selected feature based on a random number lying in the range of selected feature. This process is repeated until each leaf node contains a single training sample. Therefore, as a result, in an isolation forest model, anomalous samples are isolated at the top of the decision trees (i.e., anomalies tend have a lesser height in the tree). In one embodiment, isolation forest models 405-408 are implemented in python using the "scikit-learn" package.

In embodiments, the input feature is the normalized expense amount at the expense distribution ID level for input samples and the output of isolation forest models 405-408 is the classification label anomaly/non-anomaly with an anomaly score indicating the probability of being an anomaly at the expense distribution ID level at 420. For example, in an Expense_Dist_Id, for an employee who has claimed $2000 for a group of 4 attendees for accommodation of 2 days, the normalized expense amount=2000/(4*2)= $250.

As disclosed, predictions are generated at the expense distribution ID level at 420. Table 2 below provides details of a table generated at 420 at the expense distribution ID level:

TABLE 2

| Column name | Description |
| --- | --- |
| EXPENSE_DIST_ID | Unique Id of sub-expenses in the expense report |
| IS_ANOMALY | −1: Anomaly |
|  | 0: Unprocessed row due insufficient data, |
|  |    such rows can also be anomalies |
|  | 1: Non-Anomaly |
| ANOMALY_SCORE | This is the score returned by scikit-learn isolation forest. Negative score corresponds to anomaly points, higher magnitude of negative score means more chance of being anomaly. Positive score corresponds to non-anomaly points, higher magnitude of Positive score means more chance of being non-anomaly. |
| NORMALISED_EXPENSE_AMOUNT | Normalized expense amount for EXPENSE_DIST_ID |
| RISK | If(IS_ANOMALY== −1): |
|  |    \|ANOMALY_SCORE*NORMALISED_EXPENSE_AMOUNT\| |
|  | else: |
|  |    0 |
| ANOMALY_RANK | Rank of the Anomaly is calculated using metric ANOMALY_RISK by ordering in Descending order |

Using the above prediction at Table 2 at the expense distribution ID level at 420, embodiments then roll up/aggregate the predictions at a report ID level 421, employee ID level 422, manager ID level 423 and department ID level 424. This allows embodiments to determined specific employees who frequently claim anomalous expenses, and managers and departments who frequently approve anomalous expenses, and take required follow-up steps.

Table 3 below provides details of a table generated at 421 at the expense report ID level:

TABLE 3

| Column name | Description |
| --- | --- |
| EXPENSE_REPORT_ID | Unique Id of each expense report |
| IS_ANOMALY | −1: if at-least one EXPENSE_DIST_ID belonging to EXPENSE_REPORT_ID is anomalous<br>0: if no EXPENSE_DIST_ID belonging to EXPENSE_REPORT_ID is anomalous and at-least one EXPENSE_DIST_ID belonging to EXPENSE_REPORT_ID is unprocessed<br>1: otherwise |
| ANOMALY_SCORE | for each EXPENSE_REPORT_ID, min(ANOMALY_SCORE) of all EXPENSE_DIST_IDs belonging to it |
| RISK | sum of ANOMALY_RISK of all EXPENSE_DIST_IDs belonging to EXPENSE_REPORT_ID which are anomalous (ANOMALY_RISK for non-anomalous EXPENSE_DIST_IDs is 0) |
| ANOMALY_RANK | Rank of the Anomaly is calculated using metric ANOMALY_RISK by ordering in Descending order. |

Table 4 below provides details of the table generated at 422 at the employee ID level:

TABLE 4

| Column name | Description |
| --- | --- |
| EMPLOYEE_ID | Unique Id of employee |
| IS_ANOMALY | Is at least one anomalous claim submitted by employee |
| TOTAL_ANOMALOUS_DIST_IDS | Total Number of anomalous EXPENSE_DIST_IDs claimed by employee |
| ANOMALY_PERCENTAGE | TOTAL_ANOMALOUS_DIST_IDS/(Total EXPENSE_DIST_IDs submitted by employee) |
| RISK | Sum(\|ANOMALY_SCORE*NORMALISED_EXPENSE_AMOUNT\|) for all anomalous EXPENSE_DIST_IDs claimed by employee |
| ANOMALY_RANK | Rank calculated using metric ANOMALY_RISK by ordering in Descending order |

Table 5 below provides details of the table generated at 423 at the manager ID level:

TABLE 5

| Column name | Description |
| --- | --- |
| MANAGER_ID | Unique Id of manager |
| IS_ANOMALY | Is at least one anomalous claim approved by manager so far |
| TOTAL_ANOMALOUS_DIST_IDS | Total Number of anomalous EXPENSE_DIST_IDs approved by manager so far |
| ANOMALY_PERCENTAGE | TOTAL_ANOMALOUS_DIST_IDS/(Total EXPENSE_DIST_IDs approved by manager so far) |
| RISK | Sum(\|ANOMALY_SCORE*NORMALISED_EXPENSE_AMOUNT\|) for all anomalous EXPENSE_DIST_IDs approved by manager |
| ANOMALY_RANK | Rank calculated using metric ANOMALY_RISK by ordering in Descending order |

Table 6 below provides details of the table generated at 424 at the department ID level:

TABLE 6

| Column name | Description |
| --- | --- |
| DEPARTMENT_ID | Unique Id of Department |
| IS_ANOMALY | Is at least one anomalous claim approved by any manager belonging to department so far |
| TOTAL_ANOMALOUS_DIST_IDS | Total Number of anomalous EXPENSE_DIST_IDs approved by managers belonging to department so far |
| ANOMALY_PERCENTAGE | TOTAL_ANOMALOUS_DIST_IDS/(Total EXPENSE_DIST_IDs approved by managers belonging to department so far) |

TABLE 6-continued

| Column name | Description |
| --- | --- |
| RISK | Sum(|ANOMALY_SCORE*NORMALISED_EXPENSE_AMOUNT|) for all anomalous EXPENSE_DIST_IDs approved by managers belonging to department so far |
| ANOMALY_RANK | Rank calculated using metric ANOMALY_RISK by ordering in Descending order |

Embodiments disclosed above use isolation forest models or other tree based models. These models are considered unsupervised in that unlabeled data can be used for the training. In contrast, labeled data can require manual steps in order to label the data. However, some embodiments generate and use labeled data generated using a feedback loop on previous predictions to re-train unsupervised models and/or to train one or more supervised models (i.e., models that require labeled data for training) and use them in combination with the unsupervised models to potentially improve the accuracy of the predictions.

Figure 5:
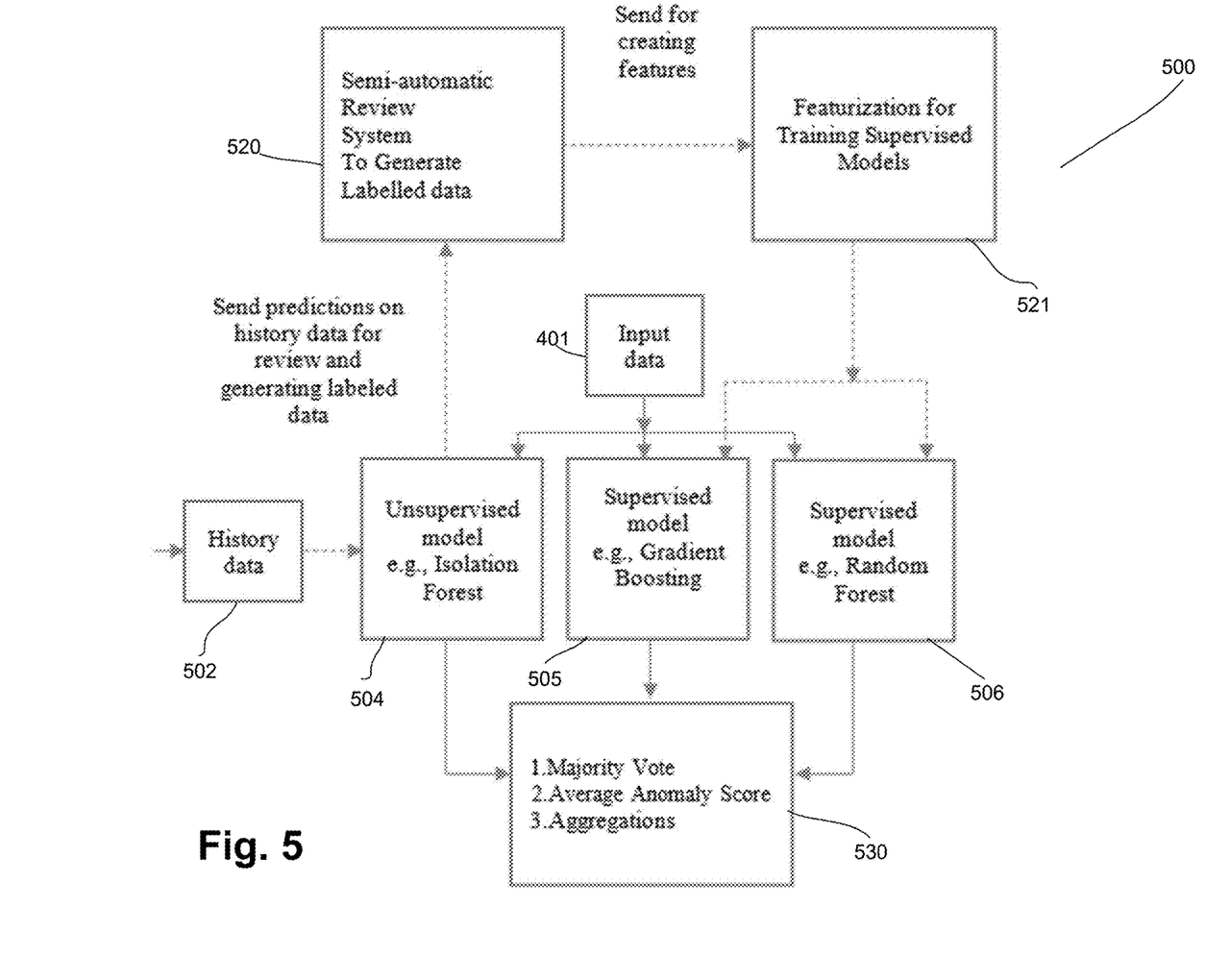
FIG. 5 is a flow/system diagram of the functionality of the expense anomaly detection module of FIG. 2 for performing expense report anomaly detection with feedback based model training/re-training in accordance with one embodiment.

FIG. 5 is a flow/system diagram of the functionality 500 of expense anomaly detection module 16 of FIG. 2 for performing expense report anomaly detection with feedback based model training/re-training in accordance with one embodiment.

Initially, embodiments generate predictions using only unsupervised isolation forest models 405-408 as disclosed above in conjunction with FIG. 4, which have been trained using unlabeled data. Enough data (i.e., enough training samples) is needed to train each isolation forest model (i.e., each group_ID). The amount of needed data to properly train the models will vary, as it depends on the way sample data is collected and how well the data represents the actual population, but generally the higher the number of samples for each group will result in better predictions for each model. In one embodiment, roughly 300-500 samples for each group are generally sufficient to adequately train each model. After predictions are generated at FIG. 4 the previous input data is now considered historical data 502 and the generated predictions made can be used to create labelled data for training supervised models 505, 506 (e.g., gradient boosting models, random forest models, etc.).

At 520, a semi-automatic review system generates the labelled data for training supervised models. The predictions made using unsupervised models 405-408 can also be reviewed and validated by users in order to assign labels and assure the quality of labels before using it for training the models, or the predictions can directly be used as labeled data in a fully automated approach.

Figure 6:
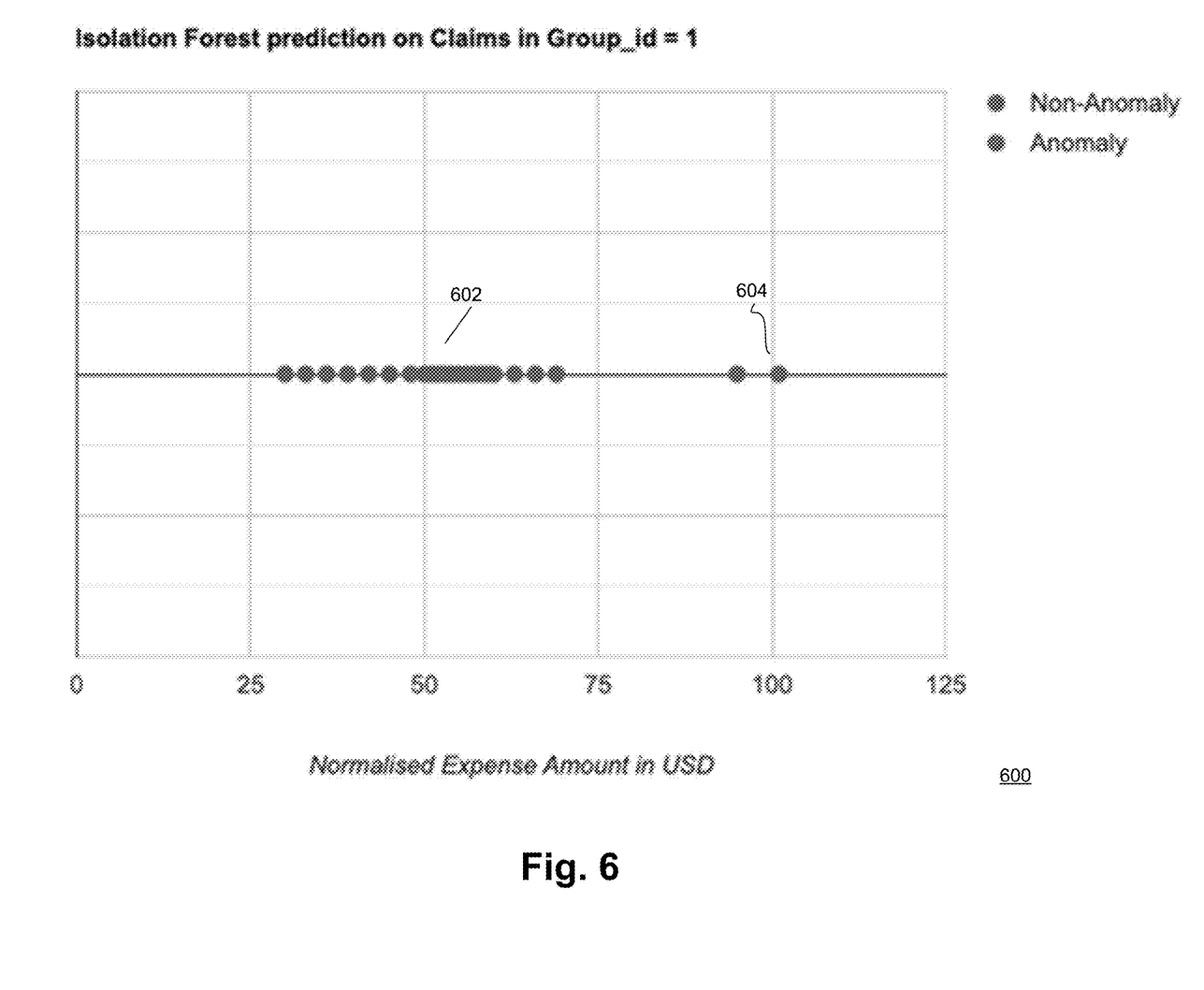
FIG. 6 is an example scatter plot for Group ID=1 in accordance to embodiments.

In embodiments, at 520 group_id wise scatter plots of anomalous and non-anomalous claims are created, which reduces the effort of manual review by a considerable extent. FIG. 6 is an example scatter plot 600 for Group ID=1 in accordance to embodiments. As shown in FIG. 6, for the predictions for each group_id, non-anomalies form dense clusters at 602 and anomalous points have very sparse clusters at 604. The process can be automated by identifying the dense and sparse clusters. Embodiments that automate the labeling can use the "local outlier factor" algorithm, which is based on a concept of a local density, where locality is given by k nearest neighbors, whose distance is used to estimate the density. By comparing the local density of an object to the local densities of its neighbors, embodiments can identify regions of similar density, and points that have a substantially lower density than their neighbors. These are considered to be outliers. Similarly, predictions at every other group_id can be automatically validated and then used as labeled data. Claims with a high anomaly score or a higher anomaly risk returned by the isolation forest models 405-408 can be validated with higher priority.

Once a labelled dataset is generated at 520, at 521 the following features are generated in embodiments for training or retraining the models. These features are generated in the format expected by the corresponding supervised algorithm using the input information corresponding to each expense report:
1. Normalized_Expense_Amount (numerical feature);
2. Expense Category (categorical feature);
3. Country where expense occurred (categorical feature);
4. State (categorical feature);
5. City-Class (categorical feature with possible values Metro/Urban/Semi-urban/Rural);
6. Year (Numerical);
7. Month (Categorical);
8. n_Weekdays (Numerical): Total number of working days in the business trip;
9. n_WeekEnds (Numerical): Total number of weekend days in the business trip.

The target variable for the supervised models 505, 506 is the binary variable IS_ANOMALY. In anomaly detection, generally the fraction of anomalous samples in the training data is very small as compared to non-anomalous samples. Therefore, because embodiments are solving an anomaly detection problem using supervised models 505, 506, embodiments up-sample anomalous samples in the labelled training data. In embodiments, Synthetic Minority Oversampling TEchnique ("SMOTE") is used to perform the upsampling.

After supervised models 505, 506 are trained using the generated labeled data, predictions are then generated based on an ensemble created using supervised models 504 and unsupervised models 505, 506. For example, FIG. 5 shows an ensemble of an unsupervised isolation forest model 504, supervised Random Forest model 505, and supervised Gradient boosting model 506, where the final prediction will be taken as a majority vote from these three models at 530. Other supervised models such as SVM or Logistic Regression can also be used in place of random forest and gradient boosting. Further other unsupervised algorithms such as "Local Outlier Factor" can be used in place of isolation forest based on available training data and accuracy tradeoff. In embodiments, the total number of unsupervised and supervised models can be more than three as well. The anomaly score will be equal to the average of anomaly scores of models as per majority vote. Aggregations at report id, employee id, manager id and department id will be performed as disclosed above.

FIG. 5 illustrates an example for a single Group ID. In one embodiment, unsupervised isolation forest model 504 will be duplicated per each Group ID, while the trained supervised models 505, 506 are shared among all groups. Further, the unsupervised models in embodiments are retrained as additional historical data becomes available to further improve the accuracy of the predictions.

Embodiments output results in the form of a user interface ("UI"). The following Table 7 is an example user interface showing the results of the Expense Distribution Level Output 420 of FIG. 4. A similar UI, or a combined UI, can be generated for the other predictions 421-424 of FIG. 4.

TABLE 7

| EXPENSE_DIST_ID | IS_ANOMALY | NORMALISED_EX-PENSE_AMOUT | ANOMALY_SCORE | ANOMALY_RISK | ANOMALY_RANK |
|---|---|---|---|---|---|
| 300100111959582 | −1 | 44 | −0.5 | 22 | 1 |
| 300100137354489 | −1 | 2 | −1.5 | 3 | 2 |
| 300100089897362 | 0 | 30 | 0 | 0 | 3 |
| 300100546393997 | 1 | 50 | 0 | 0 | 4 |

As disclosed, embodiments use machine learning models to detect anomalies in expense reports. Embodiments training the models at a location, expense category and season level so that an expense can be compared with a correct set of past expenses. Embodiments rank the predicted anomalous expenses according to associated risk, so that more risky expenses will be ranked higher. Embodiments perform aggregation from expense distribution ID level to expense report level, employee level, manager level and department level. Embodiments can combine supervised and unsupervised model predictions to arrive at final prediction.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of anomaly detection of expense reports, the method comprising:
   receiving an expense report as input data, the expense report comprising a plurality of expenses;
   creating a plurality of groups of expenses, each group corresponding to a different and unique combination of a category of the expense, a location of the expense and a season of the expense;
   generating and training an unsupervised machine learning model corresponding to each group using historical training data that corresponds to the respective group to train the respective unsupervised machine learning model, wherein the historical training data is unlabeled training data, wherein the training the unsupervised machine learning models generate a plurality of training predictions;
   assigning each of the expenses of the expense report into a corresponding group and input the expenses into the unsupervised machine learning model corresponding to the group;
   generating a first anomaly prediction at each unsupervised machine learning model for each expense of the expense report, the first anomaly predictions comprising a probability of being an anomaly for each unique group;
   generating labeled training data comprising clustering the training predictions and identifying dense clusters of the training predictions and identifying sparse clusters of the training predictions, wherein the dense clusters correspond to non-anomalies and the sparse clusters correspond to anomalies;
   training one or more supervised machine learning models using the labeled training data; and
   generating second anomaly predictions using an ensemble of the trained unsupervised machine learning model and the trained one or more supervised machine learning models.

2. The method of claim 1, further comprising:
   receiving historical expense reports corresponding to a timeframe;
   training the unsupervised machine learning models using the historical expense reports.

3. The method of claim 1, wherein each expense report includes one or more sub-expenses, and the first anomaly predictions are output at a sub-expenses level.

4. The method of claim 3, wherein the sub-expenses comprises one or more of accommodations, meals, airfare, car rental or entertainment.

5. The method of claim 1, wherein the unsupervised machine learning models comprise isolation forest models comprising unsupervised decision trees and numerical feature data.

6. The method of claim 3, further comprising outputting the first anomaly predictions at an aggregated expense report level, an aggregated employee level, an aggregated manager level and an aggregated department level.

7. The method of claim 1, further comprising:
   using the labeled training data to re-train the unsupervised machine learning models;
   wherein the identifying dense clusters of the training predictions and identifying sparse clusters of the training predictions comprises a local outlier factor comprising a local density.

8. A non-transitory computer readable medium having instructions stored thereon that, when executed by one or more processors, cause the processors to detect anomalies of expense reports, the detecting comprising:
   receiving an expense report as input data, the expense report comprising a plurality of expenses;
   creating a plurality of groups of expenses, each group corresponding to a different and unique combination of a category of the expense, a location of the expense and a season of the expense;

generating and training an unsupervised machine learning model corresponding to each group using historical training data that corresponds to the respective group to train the respective unsupervised machine learning model, wherein the historical training data is unlabeled training data, wherein the training the unsupervised machine learning models generate a plurality of training predictions;

assigning each of the expenses of the expense report into a corresponding group and input the expenses into the unsupervised machine learning model corresponding to the group;

generating a first anomaly prediction at each unsupervised machine learning model for each expense of the expense report, the first anomaly predictions comprising a probability of being an anomaly for each unique group;

generating labeled training data comprising clustering the training predictions and identifying dense clusters of the training predictions and identifying sparse clusters of the training predictions, wherein the dense clusters correspond to non-anomalies and the sparse clusters correspond to anomalies;

training one or more supervised machine learning models using the labeled training data; and generating second anomaly predictions using an ensemble of the trained unsupervised machine learning model and the trained one or more supervised machine learning models.

9. The computer readable medium of claim 8, the detecting further comprising:

receiving historical expense reports corresponding to a timeframe;

training the unsupervised machine learning models using the historical expense reports.

10. The computer readable medium of claim 8, wherein each expense report includes one or more sub-expenses, and the first anomaly predictions are output at a sub-expenses level.

11. The computer readable medium of claim 10, wherein the sub-expenses comprises one or more of accommodations, meals, airfare, car rental or entertainment.

12. The computer readable medium of claim 8, wherein the unsupervised machine learning models comprise isolation forest models comprising unsupervised decision trees and numerical feature data.

13. The computer readable medium of claim 10, the detecting further comprising outputting the anomaly prediction at an aggregated expense report level, an aggregated employee level, an aggregated manager level and an aggregated department level.

14. The computer readable medium of claim 8, the detecting further comprising:

using the labeled training data to re-train the unsupervised machine learning models;

wherein the identifying dense clusters of the training predictions and identifying sparse clusters of the training predictions comprises a local outlier factor comprising a local density.

15. An expense report anomaly detector system comprising:

a plurality of unsupervised machine learning models;

one or more processors coupled to the unsupervised machine learning models, the processors, the processors configured to:

receiving an expense report as input data, the expense report comprising a plurality of expenses;

creating a plurality of groups of expenses, each group corresponding to a different and unique combination of a category of the expense, a location of the expense and a season of the expense;

generating and training an unsupervised machine learning model corresponding to each group using historical training data that corresponds to the respective group to train the respective unsupervised machine learning model, wherein the historical training data is unlabeled training data, wherein the training the unsupervised machine learning models generate a plurality of training predictions;

assigning each of the expenses of the expense report into a corresponding group and input the expenses into the unsupervised machine learning model corresponding to the group;

generating a first anomaly prediction at each unsupervised machine learning model for each expense of the expense report, the first anomaly predictions comprising a probability of being an anomaly for each unique group;

generating labeled training data comprising clustering the training predictions and identifying dense clusters of the training predictions and identifying sparse clusters of the training predictions, wherein the dense clusters correspond to non-anomalies and the sparse clusters correspond to anomalies;

training one or more supervised machine learning models using the labeled training data; and generating second anomaly predictions using an ensemble of the trained unsupervised machine learning model and the trained one or more supervised machine learning models.

16. The system of claim 15, wherein each expense report includes one or more sub-expenses, and the first anomaly predictions are output at a sub-expenses level.

17. The system of claim 16, wherein the sub-expenses comprises one or more of accommodations, meals, airfare, car rental or entertainment.

18. The system of claim 15, wherein the unsupervised machine learning models comprise isolation forest models comprising unsupervised decision trees and numerical feature data.

19. The system of claim 15, the processors further configured to:

outputting the first anomaly predictions at an aggregated expense report level, an aggregated employee level, an aggregated manager level and an aggregated department level.

20. The system of claim 15, the processors further configured to:

using the labeled training data to re-train the unsupervised machine learning models;

wherein the identifying dense clusters of the training predictions and identifying sparse clusters of the training predictions comprises a local outlier factor comprising a local density.

* * * * *